(12) United States Patent
Saphal et al.

(10) Patent No.: US 12,159,127 B2
(45) Date of Patent: Dec. 3, 2024

(54) SYSTEMS AND METHODS FOR DETECTING CODE DUPLICATION IN CODEBASES

(71) Applicant: JPMORGAN CHASE BANK, N.A., New York, NY (US)

(72) Inventors: Rohan Saphal, Glasgow (GB); Fanny Silavong, London (GB); Sean Moran, London (GB); Antonios Georgiadis, London (GB); Sanat Saha, Mumbai (IN); Gaurav Singh, Mumbai (IN); Pierre Osselin, Le Chetelet-en-Brie (FR); Rob Otter, Witham (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 17 days.

(21) Appl. No.: 18/064,620

(22) Filed: Dec. 12, 2022

(65) Prior Publication Data

US 2023/0185550 A1 Jun. 15, 2023

(30) Foreign Application Priority Data

Dec. 13, 2021 (GR) ............... 20210100873

(51) Int. Cl.
G06F 8/41 (2018.01)
(52) U.S. Cl.
CPC ............ G06F 8/4435 (2013.01); G06F 8/427 (2013.01)
(58) Field of Classification Search
None
See application file for complete search history.

(56) References Cited

U.S. PATENT DOCUMENTS

2012/0209853 A1* 8/2012 Desai ................. G06F 16/3344
707/E17.014
2015/0363197 A1* 12/2015 Carback, III ............ G06F 8/37
717/124

(Continued)

OTHER PUBLICATIONS

Mirzaei et al. "Scrutinizer: Detecting Code Reuse in Malware via Decompilation and Machine Learning", Conference paper, First Online: Jul. 9, 2021, retrieved from <https://seclab.nu/static/publications/dimva2021scrutinizer.pdf> (Year: 2021).*

(Continued)

*Primary Examiner* — Marina Lee
(74) *Attorney, Agent, or Firm* — GREENBERG TRAURIG LLP

(57) ABSTRACT

Systems and methods for detecting code duplication are disclosed. In one embodiment, a method for detecting exact code snippet duplicates may include: (1) representing, by a code duplication detection computer program, each of a plurality of code snippets in a codebase as an abstract syntax trees; (2) featurizing, by the code duplication detection computer program, the abstract syntax trees into corpus feature vectors by converting the abstract syntax tree into vector representations; (3) generating, by the code duplication detection computer program, dense feature vectors from the corpus feature vectors using a dimension reduction technique; (4) identifying, by the code duplication detection computer program, exact duplicate code snippet matches by apply density-based clustering to the dense feature vectors; and (5) tagging, by the code duplication detection computer program, the exact duplicate code snippets.

18 Claims, 5 Drawing Sheets

(56) References Cited

U.S. PATENT DOCUMENTS

| | | | |
|---|---|---|---|
| 2019/0079754 A1* | 3/2019 | Makkar | G06N 5/022 |
| 2021/0182031 A1* | 6/2021 | Ye | G06F 8/34 |
| 2022/0035605 A1* | 2/2022 | Ibarra Von Borstel | G06F 8/425 |
| 2022/0188081 A1* | 6/2022 | Ni | G06N 3/045 |

OTHER PUBLICATIONS

International Search Report and Written Opinion of the International Searching Authority, dated May 3, 2023, from corresponding International Application No. PCT/US2022/081457.

* cited by examiner

SYSTEMS AND METHODS FOR DETECTING CODE DUPLICATION IN CODEBASES

RELATED APPLICATIONS

This application claims priority to, and the benefit of, Greek Patent Application No. 20210100873, filed Dec. 13, 2021, the disclosure of which is hereby incorporated, by reference, in its entirety.

BACKGROUND OF THE INVENTION

1. Field of the Invention

Embodiments generally relate to systems and methods for detecting code duplication in codebases.

2. Description of the Related Art

Large technical organizations face the problem of inflated codebases resulting in high maintenance cost and risk associated with code duplication. Inflated codebases occupy more space in cloud storage and require developer time to identify and refactor duplicated code, all of which results in higher costs for the organization.

SUMMARY OF THE INVENTION

Systems and methods for detecting code duplication are disclosed. In one embodiment, a method for near-detection of code duplication may include: a code duplication detection program (1) representing code in a codebase as a plurality of abstract syntax trees; (2) applying a de-noising filter to the plurality of abstract syntax trees; (3) generating a dendrogram using different values of epsilon to the abstract syntax trees; (4) identifying an optimal level in the dendrogram using statistical techniques leveraging clustering metrics; (5) identifying small unique clusters when they merge into a large cluster in the dendrogram by iteratively climbing the dendrogram; (6) tracking data points that have merged into the large cluster and are also present in the small unique clusters; wherein the data points belonging to the same unique small cluster are near duplicates of each other.

According to another embodiment, a method for exact detection of code duplication may include: a code duplication detection program (1) representing code in a codebase as a plurality of abstract syntax trees; (2) applying a de-noising filter to the plurality of abstract syntax trees; (3) reducing the dimension by applying, for example, truncated Singular Value Decomposition (SVD) and/or Principal Component Analysis (PCA) to the code representation based on, for example, abstract syntax trees or treading code as string; and (4) clustering with a small threshold, such as a small epsilon for Density Based Clustering (DB-Scan).

According to another embodiment, a method for detecting exact code snippet duplicates may include: (1) representing, by a code duplication detection computer program, each of a plurality of code snippets in a codebase as an abstract syntax trees; (2) featurizing, by the code duplication detection computer program, the abstract syntax trees into corpus feature vectors by converting the abstract syntax tree into vector representations; (3) generating, by the code duplication detection computer program, dense feature vectors from the corpus feature vectors using a dimension reduction technique; (4) identifying, by the code duplication detection computer program, exact duplicate code snippet matches by applying density-based clustering to the dense feature vectors; and (5) tagging, by the code duplication detection computer program, the exact duplicate code snippets.

In one embodiment, the method may also include applying, by the code duplication detection computer program, Natural Language Processing (NLP) to generate features for the abstract syntax trees.

In one embodiment, the method may also include applying, by the code duplication detection computer program, a de-noising filter to the plurality of code snippets or the abstract syntax trees. The de-noising filter may filter code snippets or abstract syntax trees that are not actively used, may filter code snippets or abstract syntax trees that are irrelevant, etc. The de-noising filter may be based on a trained neural network.

In one embodiment, the corpus feature vectors may include a list of featurized abstract syntax trees from a code corpus.

In one embodiment, the dimension reduction technique may include truncated Singular Value Decomposition.

According to another embodiment, a method for detecting near code snippet duplicates may include: (1) representing, by a code duplication detection computer program, each of a plurality of code snippets in a codebase as an abstract syntax trees; (2) featurizing, by the code duplication detection computer program, the abstract syntax trees into corpus feature vectors by converting the abstract syntax tree into vector representations; (3) generating, by the code duplication detection computer program, dense feature vectors from the corpus feature vectors using a dimension reduction technique; (4) clustering, by the code duplication detection computer program, the dense feature vectors into dendrograms, each dendrogram having a different value for a cluster distance metric; (5) applying, by the code duplication detection computer program, cross-correlation thresholding to identify an optimal value for the cluster distance metric; (6) applying, by the code duplication detection computer program, iterative density-based clustering to the dendrogram for the optimal value for the cluster distance metric; (7) tracking, by the code duplication detection computer program, data points in the dendrogram that have merged into a large cluster but were also present in small unique clusters, wherein the data points belonging to the same unique small cluster identify code snippets that are near duplicates of each other; and (8) tagging, by the code duplication detection computer program, the near duplicate code snippets.

In one embodiment, the method may also include applying, by the code duplication detection computer program, Natural Language Processing (NLP) to generate features for the abstract syntax trees.

In one embodiment, the method may also include applying, by the code duplication detection computer program, a de-noising filter to the plurality of code snippets or the abstract syntax trees. The de-noising filter may filter code snippets or abstract syntax trees that are not actively used, may filter code snippets or abstract syntax trees that are irrelevant, etc. The de-noising filter may be based on a trained neural network.

In one embodiment, the corpus feature vectors may include a list of featurized abstract syntax trees from a code corpus.

In one embodiment, the dimension reduction technique may include truncated Singular Value Decomposition.

According to another embodiment, a method for detecting exact code snippet duplicates may include: (1) loading, by a code duplication detection computer program, a near duplicate centroid, an exact duplicate centroid, a vectorizer, and a dimension reduction model; (2) producing, by the code duplication detection computer program, dense vectors from incremental functions; (3) representing, by a code duplication detection computer program, each of a plurality of incremental functions as an abstract syntax trees; (4) featurizing, by the code duplication detection computer program, the abstract syntax trees into incremental function feature vectors by converting the abstract syntax tree into vector representations; (5) generating, by the code duplication detection computer program, dense feature vectors from the incremental function feature vectors using the dimension reduction model; (6) computing, by the code duplication detection computer program, a cosine similarity between the generated dense vectors and the near duplicate centroid and the exact duplicate centroid; (7) ranking, by the code duplication detection computer program, the near duplicate centroid and the exact duplicate centroid in descending order based on the similarity; (8) thresholding, by the code duplication detection computer program, the ranked near duplicate centroid and the exact duplicate centroid; (9) selecting, by the code duplication detection computer program, a top most ranked centroid; and (10) identifying, by the code duplication detection computer program, the incremental function as a duplicate of data points in a cluster of the top-most centroid.

In one embodiment, the dimension reduction model may include truncated Singular Value Decomposition.

In one embodiment, the method may also include applying, by the code duplication detection computer program, Natural Language Processing (NLP) to generate features for the abstract syntax trees.

In one embodiment, the method may also include applying, by the code duplication detection computer program, a de-noising filter to the plurality of code snippets or the abstract syntax trees. The de-noising filter may filter code snippets or abstract syntax trees that are irrelevant.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are directed to systems and methods for detecting code duplication in codebases. By detecting duplicates, embodiments may improve the quality of a codebase, promote code re-use, and accelerate the code refactoring process. Embodiments may provide flexibility, in terms of being able to detect both near and exact duplicates in codebases, accuracy, in terms of being able to detect all/ maximum occurrences of duplicates across codebases and not missing out on potential ones, and usefulness by detecting duplication at a function-level, offering an actionable and natural order of refactoring process. It provides a more robust performance than approaches based on detecting consecutive lines.

Embodiments may identify both near and exact duplicates, use density-based clustering to generate a dendrogram and iteratively climb the dendrogram identifying levels where small unique clusters merge into a larger one, resulting in the identification of near duplicates, and may use abstract syntax trees to extract syntactic structure of code snippets and use it to partition similar code snippets.

Embodiments may provide offline duplication detection and online duplication detection.

Figure 1:
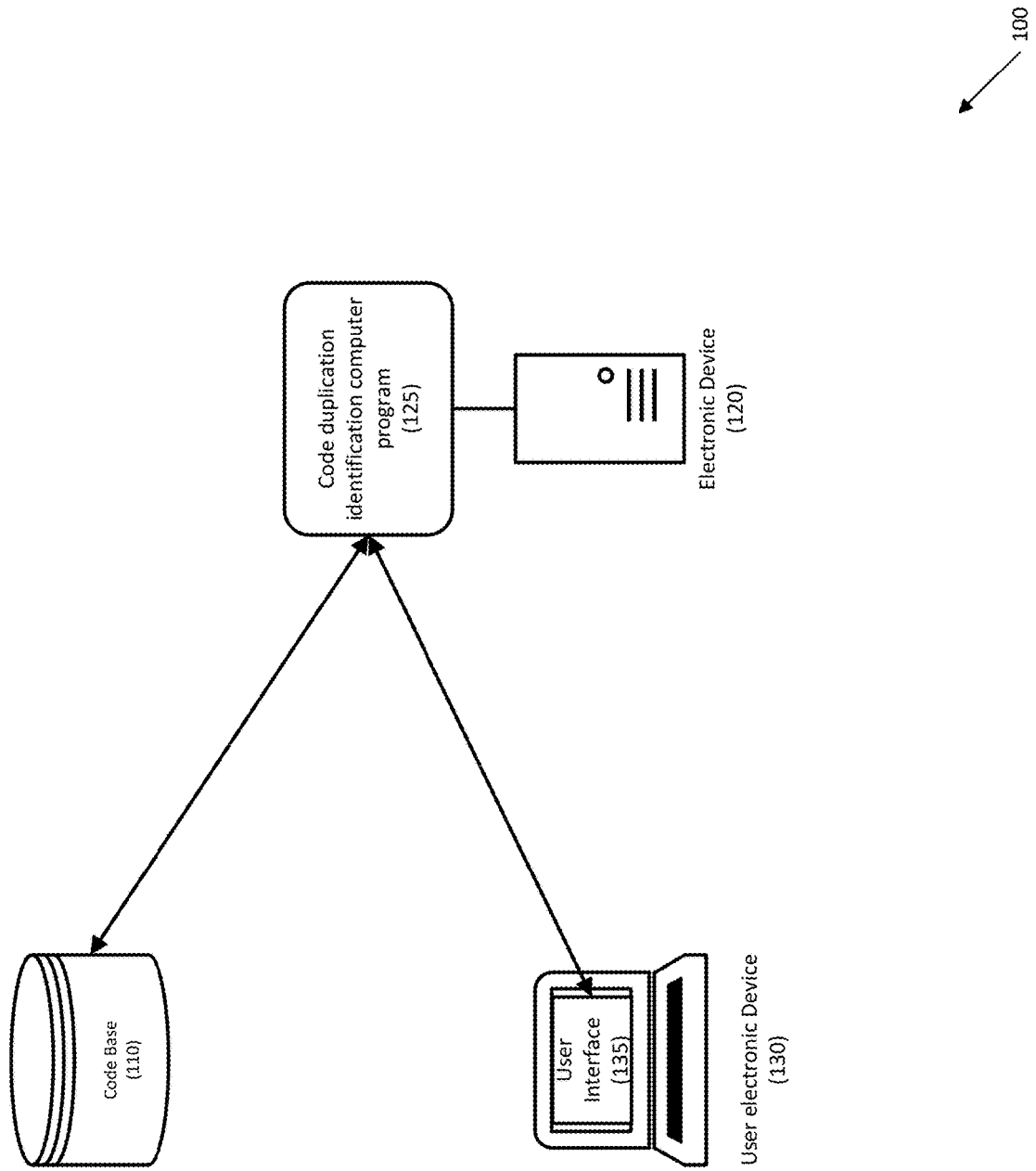
FIG. 1 depicts a system for detection of code duplication in codebases according to an embodiment.

Referring to FIG. 1, a system for detection of code duplication in codebases is disclosed according to an embodiment. System 100 may include code base 110, which may include at least a portion of code used by an organization.

System 100 may further include electronic device 120, which may be a server (e.g., physical and/or cloud-based), computer (e.g., workstation, desktop, laptop, notebook, tablet, etc.), a smart device, etc. Electronic device 120 may execute code duplication identification computer program 125, which may identify exact duplicate and near duplicate code snippets in code base 110.

System 100 may further include user electronic device 130 that may execute user interface 135, which may be a computer program, a browser, etc. User interface 135 may allow a user to visualize the exact and near duplicate code snippets. For instance, user interface 135 may access an integrated development environment (IDE), a code editor, etc., and duplicate groups for a code snippet and their locations within the codebase may be illustrated.

Depending on computational requirements, code duplication identification computer program 125 may perform duplication identification in an off-line process or in an on-line process. In the off-line process, the centroids of Density-based Clustering, Iterative Density-based Clustering, and the dimension reduction model (e.g., a Truncated SVD), vectorizers are used to convert code snippet to its vector representation in order to identify duplicates. In the on-line process, an incremental function may be used to identify duplicates.

Figure 2:
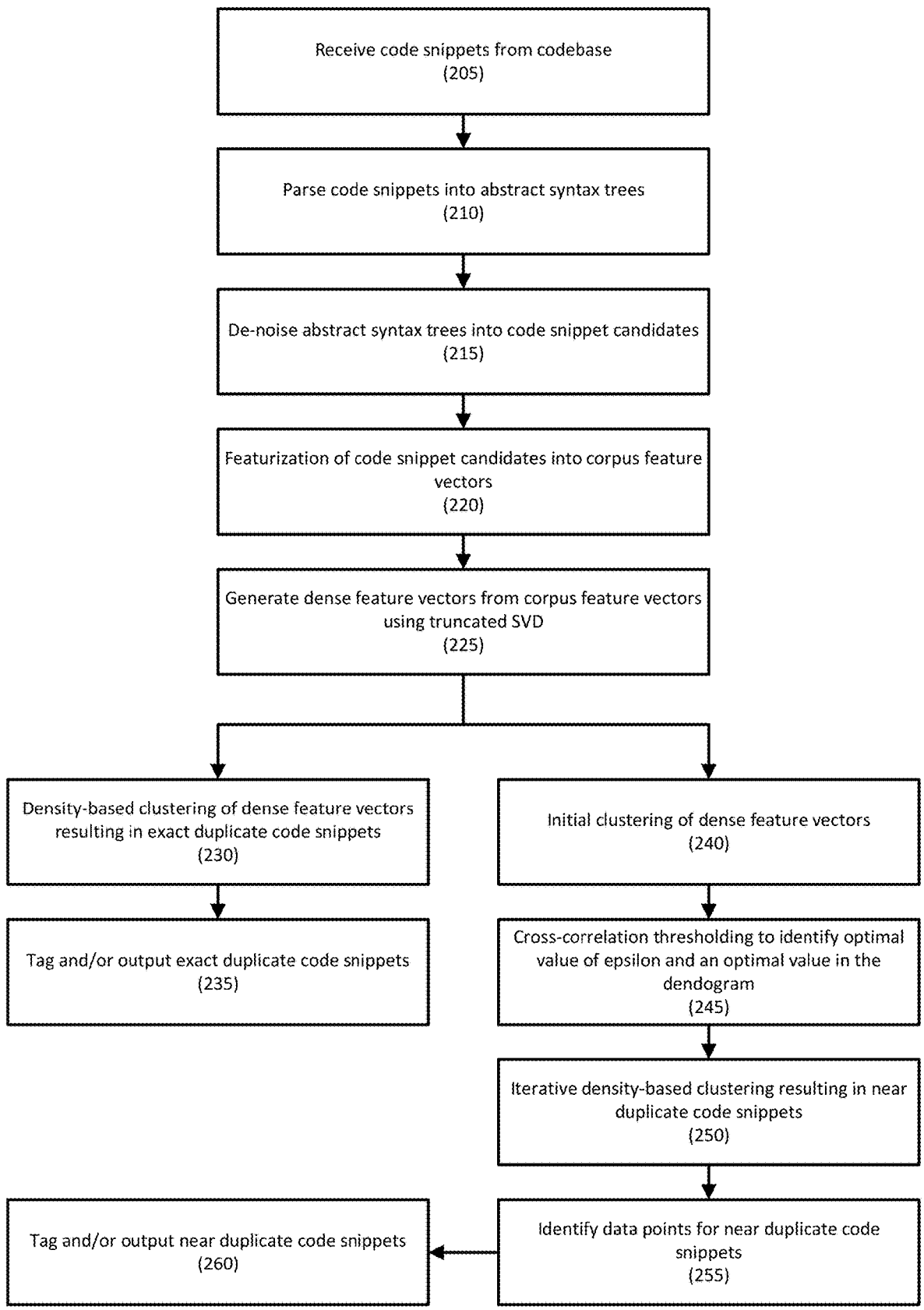
FIG. 2 depicts a method for detection of code duplication in codebases using an off-line process according to an embodiment.

Referring to FIG. 2, a method for detection of code duplication in codebases using an off-line process is disclosed according to an embodiment.

In step 205, a computer program, such as a code duplication identification computer program, may receive code, such as code snippets, from a codebase.

In step 210, the computer program may represent the code snippets as one or more Abstract Syntax Trees (AST) representations. In one embodiment, each function in the code snippet may result in one AST. For example, if a code snippet includes multiple functions, the computer program may treat the code snippet as a multiple input and may return duplicate clusters per function present in the input.

In one embodiment, Natural Language Processing (NLP), such as bag of words representation, may be applied to the code. NLP may generate features based on the AST representation, and vectorizes the code snippet.

In step 215, the computer program may apply a de-noising filter to the abstract syntax trees, resulting in code snippet candidates. In one embodiment, the de-noising may be applied to the ASTs, or it may be applied to the code snippets before they are converted to ASTs. The filtering may filter out code snippets that are not actively used, filter code snippets that are of interest, etc.

In one embodiment, the de-noising filter may use heuristics based on metadata (e.g., repository statistics, such as how often the code snippet is used, whether the code snippet is a test function, etc.) to filter out irrelevant code snippets. The de-noising filtering may be context-driven and may be user defined (e.g., filter out all functions with X prefix).

In another embodiment, a learned mapping that filters out irrelevant code snippets may be used. The learned mapping may be learnt from user-generated truth data of whether the duplications are valid/irrelevant. In one embodiment, a neural network may be trained to identify relevant and irrelevant code snippets.

In another embodiment, users may specify patterns for the filtering in order to filter code snippets of interest. For example, the user may specify a regular expression (regex) pattern on a file name, function name, etc.

In step 220, the computer program may featurize the code snippet candidate ASTs into corpus feature vectors by converting the code snippets ASTs to vector representation. The vector representation may be based on a machine learning model, or may be the result of converting (tree-based) features extracted from abstract syntax tree into a sparse vector. The corpus feature vectors may be a list of featurized code snippet ASTs from the entire code corpus and may reference a matrix where each row correspond to one method/function/class.

In one embodiment, the code snippet candidates may be vectorized using bag of word representation of the tokens in the AST, sub-nodes in the AST, and/or relationship in the AST.

In step 225, the computer program may generate dense feature vectors from the corpus feature vectors using one or more dimension reduction techniques, such as truncated SVD. The dimensional reduction technique may transform each corpus feature vector into its lower dimensions, such as a sparse vector of size N to dense vector of size M or dense vector of size N to dense vector of size M, where N<M. M and N are hyper-parameters and may be adjusted to what achieves the highest performance if truth data is available.

In step 230, the computer program may identify exact duplicate code snippet matches by applying density-based clustering of the dense feature vectors. For example, clusters may be extracted using a very small value of a cluster distance metric, such as epsilon. An example value for epsilon is 0.0000001. The value of epsilon may be very small because the objective is to detect exact duplicates; thus, the closer two datapoints are more likely its exact duplicates. Using a small value of epsilon, each cluster is a group of exact duplicate data points, where the data points within the group are exact duplicates of each other.

Other algorithms may be used as is necessary and/or desired.

In step 235, the exact duplicate code snippets may be tagged or output. In one embodiment, the exact duplicate code snippets, their locations, etc. may be presented to the user, and may also be used to facilitate code-refactoring and consolidation.

In step 240, the computer program may also perform an initial clustering of dense feature vectors. For example, the computer program may generate a dendrogram for the dense feature vectors using different values of epsilon. For example, multiple dendrograms may be created, each for a different value of epsilon.

Next, in step 245, the computer program may apply cross-correlation thresholding to identify an optimal value for epsilon. The computer program may also identify an optimal level in the dendrogram using statistical techniques leveraging clustering metrics.

In step 250, the computer program may apply iterative density-based clustering to the dendrogram for the optimal value of epsilon, resulting in near duplicate code snippets. For example, the computer program may iteratively climb the dendrogram identifying small unique clusters when they merge into a large cluster. The optimal value of epsilon is used to determine at the starting point of dendrogram climbing.

Figure 3:
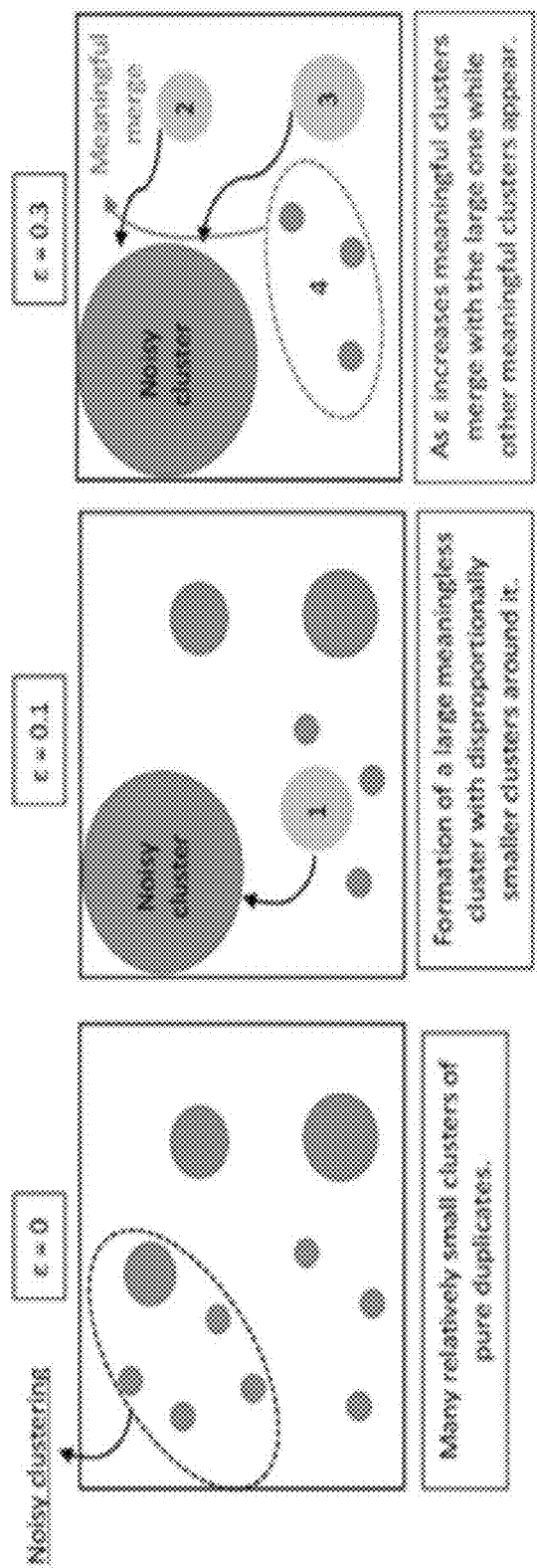
FIG. 3 depicts examples of iterative density-based clustering for different values of epsilon.

Examples of iterative density-based clustering for different values of epsilon ($\epsilon$) are provided in FIG. 3.

In step 255, the computer program may track the data points that are the feature representation of code snippets in the corpus that have merged into the large cluster but were also present in the small unique clusters. The data points belonging to the same unique small cluster identify code snippets that are near duplicates of each other.

In step 260, the near duplicate code snippets may be tagged or output. In one embodiment, the near duplicate code snippets, their locations, etc. may be presented to the user, and may also be used to facilitate code-refactoring and consolidation.

Figure 4:
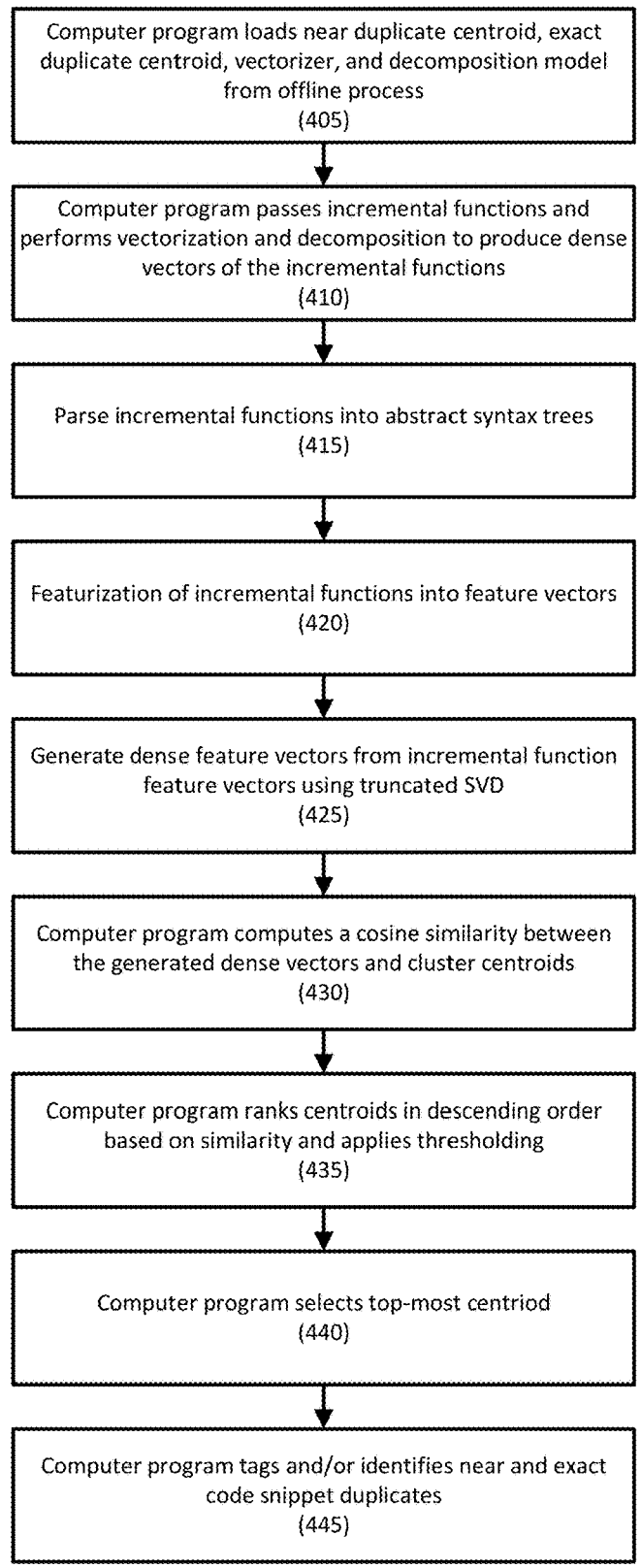
FIG. 4 depicts a method for incremental duplication detection in codebases using an on-line process according to an embodiment.

Referring to FIG. 4, a method for incremental duplication detection in codebases is provided according to an embodiment. In one embodiment, this method may be performed online.

In step 405, a computer program may load a near duplicate centroid and an exact duplicate centroid, a vectorizer, and a decomposition model, such as a truncated SDV. In one embodiment, these models may be saved during training in the offline process and those models may be retrieved.

In step 410, the computer program may pass incremental functions (e.g., a set of "new" code snippets that users have added, modified, or deleted to determine if these incremental functions are, or were, duplicates or near duplicates of existing code snippets. Thus, embodiments may perform vectorization and decomposition to produce dense vectors of these incremental functions.

In step 415, the computer program may parse the incremental functions into AST representations. This may be similar to step 210.

In one embodiment, a denoising filter may be optionally applied to the incremental functions.

In step 420, the computer program may featurize the incremental function ASTs into feature vectors by converting the code snippets ASTs to vector representation using the trained vectorizer.

In step 425, the computer program may generate dense feature vectors from the corpus feature vectors using one or more dimension reduction techniques, such as the truncated SVD that was loaded in step 405.

In step 430, the computer program may compute a cosine similarity between the generated dense vectors and the near duplicate centroid and the exact duplicate centroid.

In step 435, the computer program may rank the exact and near duplicate centroids in descending order based on the similarity, and only centroids above a certain similarity threshold may be selected.

In step 440, the computer program may select the top-most centroid may then be selected.

In step 445, the incremental function is a duplicate of the data points in the cluster of the top-most centroid. In one embodiment, the vectorized dense vector of the incremental functions may be compared to the historical clusters of exact and near duplicates. If they are "close" to each other, the incremental functions are duplicates. Closeness may be determined by computing a similarity between the function and the near and exact centroids of the clusters.

Figure 5:
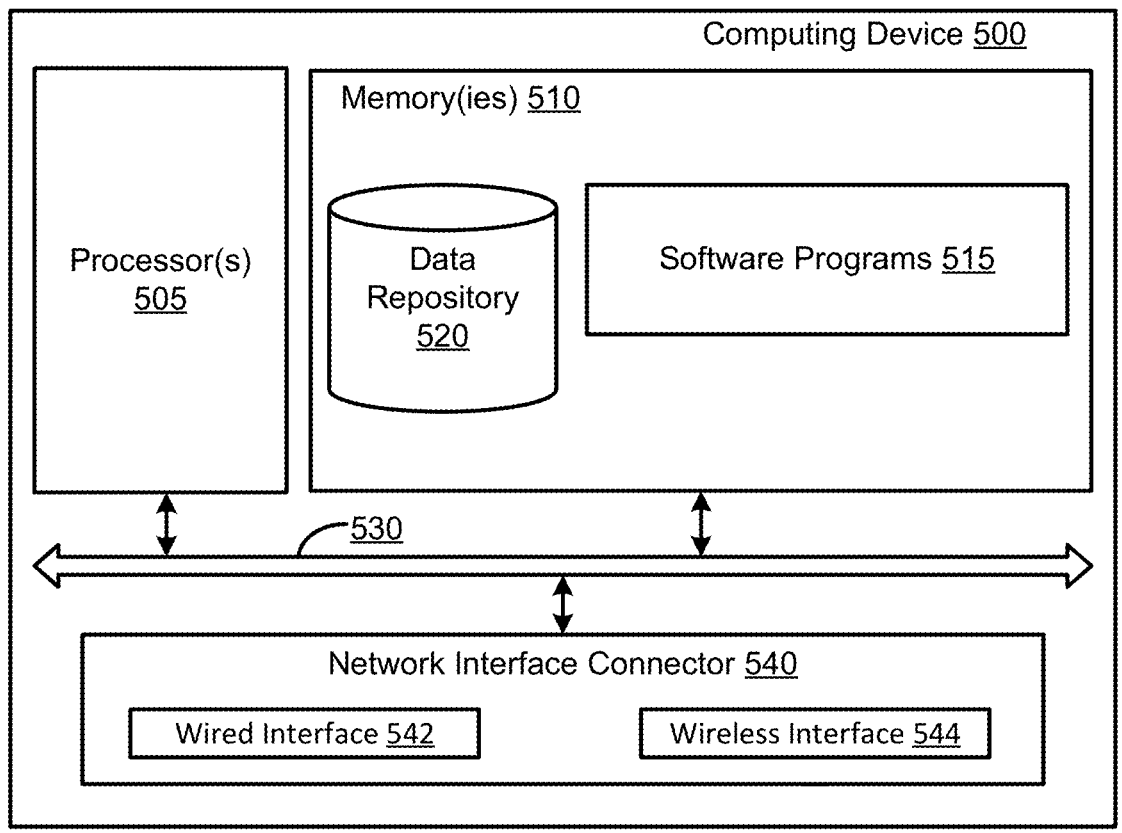
FIG. 5 depicts an exemplary computing system for implementing aspects of the present disclosure.

FIG. 5 depicts an exemplary computing system for implementing aspects of the present disclosure. FIG. 5 depicts exemplary computing device 500. Computing device 500 may represent the system components described herein. Computing device 500 may include processor 505 that may be coupled to memory 510. Memory 510 may include volatile memory. Processor 505 may execute computer-executable program code stored in memory 510, such as software programs 515. Software programs 515 may include one or more of the logical steps disclosed herein as a programmatic instruction, which may be executed by processor 505. Memory 510 may also include data repository 520, which may be nonvolatile memory for data persistence. Processor 505 and memory 510 may be coupled by bus 530. Bus 530 may also be coupled to one or more network interface connectors 540, such as wired network interface 542 or wireless network interface 544. Computing device 500 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for detecting exact code snippet duplicates, comprising:

representing, by a code duplication detection computer program, each of a plurality of code snippets in a codebase as abstract syntax trees;

applying, by the code duplication detection computer program, a de-noising filter to the plurality of code snippets or the abstract syntax trees;

featurizing, by the code duplication detection computer program, the abstract syntax trees into corpus feature vectors by converting the abstract syntax tree into vector representations;

generating, by the code duplication detection computer program, dense feature vectors from the corpus feature vectors using a dimension reduction technique;

clustering, by the code duplication detection computer program, the dense feature vectors into dendrograms, each dendrogram having a different value for a cluster distance metric;

applying, by the code duplication detection computer program, cross-correlation thresholding to identify an optimal value for the cluster distance metric;

applying, by the code duplication detection computer program, iterative density-based clustering to the dendrogram for the optimal value for the cluster distance metric;

identifying, by the code duplication detection computer program, exact duplicate code snippet matches by apply density-based clustering to the dense feature vectors; and tagging, by the code duplication detection computer program, the exact duplicate code snippets.

2. The method of claim 1, further comprising:
applying, by the code duplication detection computer program, Natural Language Processing (NLP) to generate features for the abstract syntax trees.

3. The method of claim 1, wherein the de-noising filter filters code snippets or abstract syntax trees that are not actively used.

4. The method of claim 1, wherein the de-noising filter filters code snippets or abstract syntax trees that are irrelevant.

5. The method of claim 1, wherein the de-noising filter is based on a trained neural network.

6. The method of claim 1, wherein the corpus feature vectors comprise a list of featurized abstract syntax trees from a code corpus.

7. The method of claim 1, wherein the dimension reduction technique comprises truncated Singular Value Decomposition.

8. A method for detecting near code snippet duplicates, comprising:
representing, by a code duplication detection computer program, each of a plurality of code snippets in a codebase as abstract syntax trees;
applying, by the code duplication detection computer program, a de-noising filter to the plurality of code snippets or the abstract syntax trees;
featurizing, by the code duplication detection computer program, the abstract syntax trees into corpus feature vectors by converting the abstract syntax trees into vector representations;
generating, by the code duplication detection computer program, dense feature vectors from the corpus feature vectors using a dimension reduction technique;
clustering, by the code duplication detection computer program, the dense feature vectors into dendrograms, each dendrogram having a different value for a cluster distance metric;
applying, by the code duplication detection computer program, cross-correlation thresholding to identify an optimal value for the cluster distance metric;
applying, by the code duplication detection computer program, iterative density-based clustering to the dendrogram for the optimal value for the cluster distance metric;
tracking, by the code duplication detection computer program, data points in the dendrogram that have merged into a large cluster but were also present in small unique clusters, wherein the data points belonging to the unique small cluster to identify code snippets that are near duplicates of each other; and
tagging, by the code duplication detection computer program, the near duplicate code snippets.

9. The method of claim 8, further comprising:
applying, by the code duplication detection computer program, Natural Language Processing (NLP) to generate features for the abstract syntax trees.

10. The method of claim 8, wherein the de-noising filter filters code snippets or abstract syntax trees that are not actively used.

11. The method of claim 8, wherein the de-noising filter is based on a trained neural network.

12. The method of claim 8, wherein the corpus feature vectors comprise a list of featurized abstract syntax trees from a code corpus.

13. The method of claim 8, wherein the dimension reduction technique comprises truncated Singular Value Decomposition.

14. A method for detecting exact code snippet duplicates, comprising:
loading, by a code duplication detection computer program, a near duplicate centroid, an exact duplicate centroid, a vectorizer, and a dimension reduction model;
producing, by the code duplication detection computer program, dense vectors from incremental functions;
representing, by a code duplication detection computer program, each of a plurality of incremental functions as abstract syntax trees;
featurizing, by the code duplication detection computer program, the abstract syntax trees into incremental function feature vectors by converting the abstract syntax trees into vector representations;
generating, by the code duplication detection computer program, dense feature vectors from the incremental function feature vectors using the dimension reduction model;
computing, by the code duplication detection computer program, a cosine similarity between the generated dense vectors and the near duplicate centroid and the exact duplicate centroid;
ranking, by the code duplication detection computer program, the near duplicate centroid and the exact duplicate centroid in descending order based on the similarity;
thresholding, by the code duplication detection computer program, the ranked near duplicate centroid and the exact duplicate centroid;
selecting, by the code duplication detection computer program, a top most ranked centroid; and
identifying, by the code duplication detection computer program, the incremental function as a duplicate of data points in a cluster of the top-most centroid.

15. The method of claim 14, wherein the dimension reduction model comprises truncated Singular Value Decomposition.

16. The method of claim 14, further comprising:
applying, by the code duplication detection computer program, Natural Language Processing (NLP) to generate features for the abstract syntax trees.

17. The method of claim 14, further comprising:
applying, by the code duplication detection computer program, a de-noising filter to the plurality of the abstract syntax trees.

18. The method of claim 17, wherein the de-noising filter filters abstract syntax trees that are irrelevant.

* * * * *